(12) United States Patent
Schantz

(10) Patent No.: US 10,554,253 B2
(45) Date of Patent: Feb. 4, 2020

(54) NARROWBAND IMPULSE RADIO SYSTEM AND METHOD

(71) Applicant: Hans Gregory Schantz, Big Cove, AL (US)

(72) Inventor: Hans Gregory Schantz, Big Cove, AL (US)

(73) Assignee: GaN Corp., Huntsville, AL (US)

( * ) Notice: Subject to any disclaimer, the term of this patent is extended or adjusted under 35 U.S.C. 154(b) by 0 days.

(21) Appl. No.: 16/000,878

(22) Filed: Jun. 5, 2018

(65) Prior Publication Data

US 2019/0044573 A1 Feb. 7, 2019

Related U.S. Application Data

(60) Provisional application No. 62/515,514, filed on Jun. 5, 2017.

(51) Int. Cl.
*H04B 1/7163* (2011.01)

(52) U.S. Cl.
CPC .................. *H04B 1/7163* (2013.01)

(58) Field of Classification Search
CPC .............. H04B 1/7163; H04B 1/71632; H04B 1/71635; H04B 1/71637; H04B 1/717; H04B 1/7172; H04B 1/7174
See application file for complete search history.

(56) References Cited

U.S. PATENT DOCUMENTS

| | | |
|---|---|---|
| 1,577,421 A | 3/1926 | Hazeltine |
| 2,659,004 A | 3/1948 | Lindenblad |
| 3,413,644 A | 11/1968 | Laub |
| 3,953,799 A | 4/1976 | Albee |
| 4,171,525 A | 10/1979 | Seeley |
| 6,218,979 B1 * | 4/2001 | Barnes ................ G01S 13/0209 342/22 |
| 6,538,617 B2 | 3/2003 | Rochelle |

(Continued)

OTHER PUBLICATIONS

Schantz "Proof-of-Concept C-UWB Data Link", IEEE Sarnoff Symposium, May 2008, pp. 1-5.

(Continued)

*Primary Examiner* — Siu M Lee
(74) *Attorney, Agent, or Firm* — Mark P Kahler

(57) ABSTRACT

A narrowband impulse radio system includes a transmitter, transmitting a plurality of harmonic signals, and a receiver, receiving the signals, wherein the signals cooperate in a constructive alignment to yield a narrowband impulse signal of amplitude approximately equal to the sum of the amplitudes of the plurality of harmonic signals. The transmitter or the receiver may employ a plurality of phase shifters to effect the cooperation in the transmitted or received signals, respectively. The harmonic signals cooperate to yield a quasi-DC signal whose pulse rate equals the fundamental harmonic frequency. In a preferred embodiment, the narrowband impulse transmitter further includes a plurality of transmit modules each transmitting one of the plurality of harmonics. The plurality of transmit modules may employ magnetic antennas characterized by a magnetic axis aligned at an angle of approximately 55 degrees relative to a common axis, or in other embodiments, may employ mechanically rotating permanent magnets.

18 Claims, 10 Drawing Sheets

(56) References Cited

U.S. PATENT DOCUMENTS

| | | | |
|---|---|---|---|
| 7,190,729 B2 | 3/2007 | Siwiak | |
| 7,206,334 B2 | 4/2007 | Siwiak | |
| 7,394,846 B2 | 7/2008 | Siwiak | |
| 7,787,513 B2 | 8/2010 | Siwiak | |
| 9,209,525 B2 | 12/2015 | Schantz | |
| 2003/0202794 A1* | 10/2003 | Izadpanah | H01Q 3/2676 |
| | | | 398/115 |
| 2004/0136438 A1* | 7/2004 | Fullerton | H03C 1/02 |
| | | | 375/130 |
| 2006/0061770 A1* | 3/2006 | Erskine | G01J 3/10 |
| | | | 356/484 |
| 2011/0286618 A1* | 11/2011 | Vandali | G10L 25/90 |
| | | | 381/320 |

OTHER PUBLICATIONS

AMEBA—A MEchanically Based Antenna (AMEBA) Question & Answer, DARPA (Mar. 8, 2017), pages.

Olsson—"A Mechanicaly Based Antenna (AMEBA)" DARPA/MTO (Jan. 6, 2017), pp. 1-34.

Owens—"For Underwater Drone Communication", Defense Systems (Jun. 2, 2017), pp. 1-6.

Stackler—"Mechanical Radio Transmitter Technology Could Be a Game Changer for Low-Frequency Communication" (Oct. 12, 2017) pp. 1-4.

Cyganski—"A Multi-Carrier Technique for Precision Geolocation for Indoor/Multipath Environments", Proceedings of he 16th International Technical Meeting of the Satellite Division of the Institute of Navigation (ION GPS/GNSS 2003), Portland, OR, Sep. 2003, (pp. 1069-1073).

* cited by examiner

NARROWBAND IMPULSE RADIO SYSTEM AND METHOD

CROSS REFERENCE TO RELATED PATENT APPLICATIONS

This patent application claims priority to Provisional Patent Application 62/515,514 filed on Jun. 5, 2017, entitled "Narrowband Impulse Radio System and Method", Inventor, Hans Gregory Schantz, the disclosure of which is incorporated herein by reference in its entirety.

BACKGROUND

The disclosures herein relate generally to radio frequency (RF) communications, radar and location systems. More specifically, the disclosed embodiments of the invention relate to RF generation and reception including continuous wave radio and impulse radio.

BRIEF SUMMARY

The present invention pertains to a narrowband impulse radio that combines the impulse-like waveform of ultrawideband systems with the advantages of narrowband radio systems employing continuous wave (CW) signals.

A narrowband impulse radio (NBIR) is disclosed that includes a transmitter, transmitting a plurality of harmonic signals, and a receiver, receiving a plurality of harmonic signals, wherein the harmonic signals cooperate in a constructive alignment to yield a narrowband impulse signal of amplitude approximately equal to the sum of the amplitudes of the plurality of signals. The transmitter may employ a plurality of phase shifters to effect the cooperation in the transmitted signal, and the receiver may employ a plurality of phase shifters to effect the cooperation in the received signal. The harmonic signals cooperate to yield a quasi-DC signal whose pulse rate that is equal to the fundamental harmonic frequency. In a preferred embodiment, the narrowband impulse transmitter further includes a plurality of transmit modules each of the plurality of transmit modules transmitting one of the plurality of harmonics, each of the plurality of transmit modules further including a magnetic antenna, each of the magnetic antennas characterized by a magnetic axis, each of the magnetic axes aligned at an angle of approximately 55 degrees relative to a common axis. In a preferred embodiment, a narrowband impulse receiver employs a directional electrically-small antenna.

In one embodiment, a narrowband impulse radio (NBIR) system is disclosed that includes a transmitter that transmits a plurality of harmonic signals. The system also includes a receiver that receives the plurality of harmonic signals, wherein the plurality of harmonic signals cooperate in a constructive alignment to provide a narrowband impulse signal exhibiting an amplitude approximately equal to the sum of the amplitudes of the plurality of harmonic signals.

In another embodiment, a narrowband impulse radio (NBIR) system is disclosed that includes a transmitter that transmits a plurality of harmonic signals. In this embodiment, the plurality of harmonic signals cooperate in a constructive alignment to provide a narrowband impulse signal exhibiting an amplitude approximately equal to the sum of the amplitudes of the plurality of harmonic signals. Moreover, in this embodiment, each harmonic signal of the plurality of harmonic signals transmitted by the transmitter exhibits a respective phase, the transmitter including a plurality of phase shifters that adjust the respective phases of the plurality of harmonic signals to provide the constructive alignment.

In yet another embodiment, a narrowband impulse radio (NBIR) system is disclosed that includes a receiver that receives a plurality of harmonic signals. In this embodiment, the plurality of harmonic signals cooperate in a constructive alignment to provide a narrowband impulse signal exhibiting an amplitude approximately equal to the sum of the amplitudes of the plurality of harmonic signals. Further, in this embodiment, each harmonic signal of the plurality of harmonic signals received by the receiver exhibits a respective phase, the receiver including a plurality of phase shifters that adjust the respective phases of the plurality of harmonic signals to provide the constructive alignment In still another embodiment, a method of transmitting a narrowband impulse radio (NBIR) signal is disclosed that includes transmitting, by a plurality of transmitter modules, a respective plurality of harmonic signals, wherein the plurality of harmonic signals cooperate in a constructive alignment to provide a narrowband impulse signal exhibiting an amplitude approximately equal to the sum of the amplitudes of the plurality of harmonic signals, wherein each harmonic signal of the plurality of harmonic signals exhibits a respective phase. The method further includes adjusting, by a plurality of phase shifters in the plurality of transmitter modules, the respective phases of the plurality of harmonic signals to provide the constructive alignment.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Overview

The Perceived Incompatibility Between Narrowband and Impulse Radio

A narrowband impulse radio system and method reconciles two characteristics previously thought irreconcilable—short time duration impulse signaling and narrow frequency bandwidth operation.

Figure 1A:
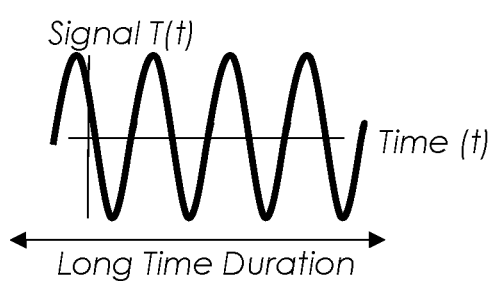
FIG. 1A presents a representative prior-art continuous-wave (CW) signal in the time domain.

FIG. 1A presents a representative prior-art continuous-wave (CW) signal in the time domain. The representative prior-art continuous-wave (CW) signal is exhibits a long time duration sinusoidal response.

Figure 1B:
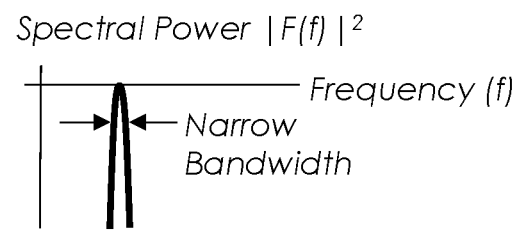
FIG. 1B depicts a representative prior-art continuous wave signal in the frequency domain.

FIG. 1B depicts a representative prior-art continuous wave signal in the frequency domain. The representative prior-art continuous wave signal exhibits a narrow band frequency response.

The representative CW signal of FIG. 1A and FIG. 1B has many benefits, including but not limited to:
  noise reduction via spectral filtering,
  ability to use compact, high-Q, electrically-small antennas,
  ability to accommodate multiple users and uses through spectral channels and allocations, and
  a low peak-to-average ratio which makes for efficient transmit power amplifier design.

The representative CW signal of FIG. 1A and FIG. 1B also suffers from some disadvantages and vulnerabilities, including, but not limited to:
  interception or jamming by hostile parties, and
  an inability to precisely determine time-of-arrival which makes it difficult to employ the representative prior-art CW signal in a radar or location system.

Figure 1C:
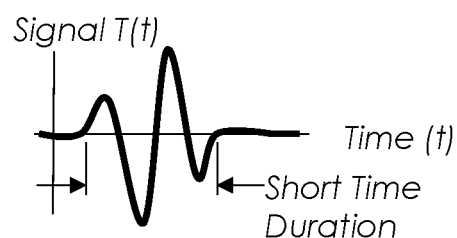
FIG. 1C shows a representative prior-art impulse signal in the time domain.

FIG. 1C shows a representative prior art impulse signal in the time domain. The representative prior-art impulse signal is characterized by a short time duration sinusoidal response.

Figure 1D:
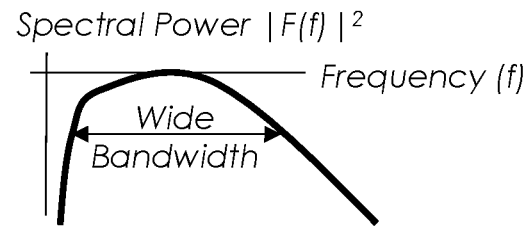
FIG. 1D displays a representative prior-art impulse signal in the frequency domain.

FIG. 1D displays a representative prior art impulse signal in the frequency domain. The representative prior-art impulse signal is characterized by broad-band frequency response.

The representative impulse signal of FIG. 1C and FIG. 1D has many benefits, including but not limited to:
  noise reduction via time-gating,
  ability to accommodate multiple users and uses through time-division multiple access,
  the ability to determine a time-of-arrival for a precise location or radar range measurement,
  the ability to yield a low-probability of interception (LPI) signal, and
  a high peak-to-average ratio which makes it easier to identify a signal in the presence of noise.

The representative impulse signal of FIG. 1C and FIG. 1D also suffers from some disadvantages and vulnerabilities, including, but not limited to: difficulty co-existing with other in-band signals without mutual interference,
  the need for high dynamic range RF hardware to accommodate a high peak-to-average signal,
  the need to employ an ultra-wideband antenna typically a quarter wavelength in dimension or larger, and
  an inability to operate at low-frequencies in a compact form factor.

In the present art, these respective advantages are widely regarded to require a choice between mutually exclusive alternatives: namely, either CW-like or impulse-like signals. The disclosed Narrowband Impulse Radio (NBIR) technology traverses what is regarded as a fundamental engineering tradeoff by presenting a novel system and method combining the advantages of both approaches while avoiding their respective disadvantages—a narrowband impulse radio system and method. Additional benefits and advantages will become clear upon review of the following disclosure.

Narrowband Impulse Radio (NBIR)

Figure 2A:
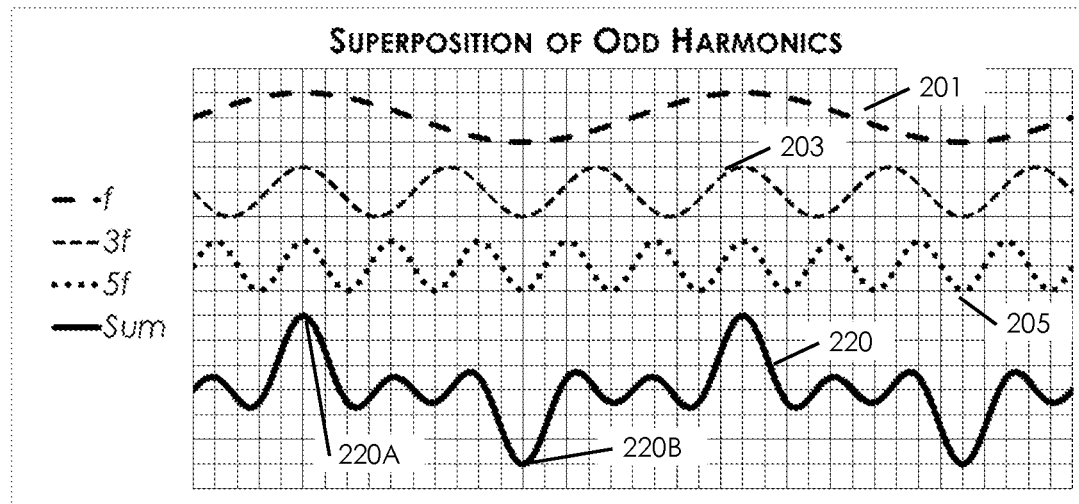
FIG. 2A shows a representative superposition of odd harmonics in the time domain.

FIG. 2A shows a first representative superposition of odd harmonics in the time domain in accordance with the disclosed apparatus and methodology. A first time-domain harmonic 201 with frequency "f," a third time-domain harmonic 203 with frequency "3f," and a fifth time-domain harmonic 205 with frequency "5f," sum in a constructive alignment to yield an odd-harmonic time-domain narrowband impulse (NBIR) signal 220 with an amplitude equal to the sum of the composite harmonics (201, 203, 205). In this depiction, "f" represents the fundamental frequency, i.e. the first harmonic 201. The first harmonic 201, third harmonic 203 and fifth harmonic 205 are depicted in dashed lines, while the NBIR signal is depicted by a solid line.

Figure 2B:
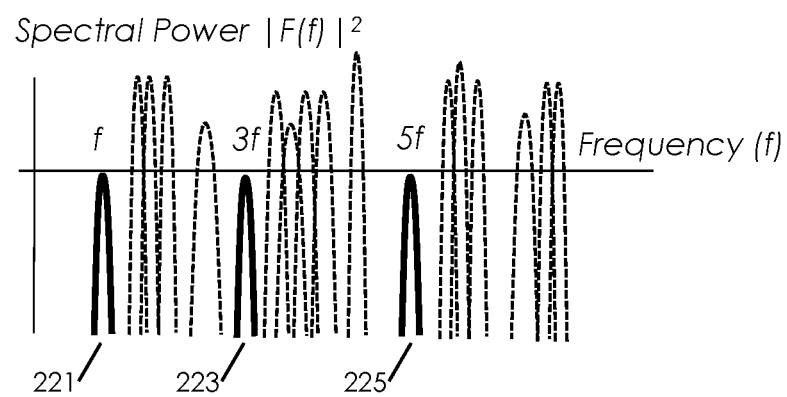
FIG. 2B depicts the representative superposition of odd harmonics in the frequency domain.

FIG. 2B depicts the first representative superposition of odd harmonics in the frequency domain in accordance with the disclosed apparatus and methodology. A first frequency-domain narrow-band harmonic 221 with frequency "f," a third frequency-domain narrow-band harmonic 223 with frequency "3f," and a fifth frequency-domain narrow-band harmonic 225 with frequency "5f," together form the spectral response, i.e. spectral footprint, of the odd harmonic time-domain narrowband impulse (NBIR) signal 220. In FIG. 2B, this odd harmonic (221, 223 and 225) spectral response is depicted in solid line, while other signals in the propagation environment are depicted in dashed line.

The first representative superposition of odd harmonics illustrates a few key principles and characteristics of an NBIR signal. The narrow-band nature of individual harmonics (like odd harmonics 221, 223, and 225) shown by solid lines, allows for compatibility with a spectral footprint of other signals shown by dashed lines, enabling easy co-use of valuable spectrum. In both the time domain and the frequency domain, the peak amplitude of the NBIR signal varies in direct proportion to the number, N, of individual harmonics (such as harmonics 221, 223, and 225, e.g. N=3). However, the peak energy of the NBIR signal varies in direct proportion to the square of the number of harmonics (e.g. $N^2=9$).

An NBIR signal exhibiting odd harmonics (such as the odd-harmonic time-domain narrowband impulse (NBIR) signal 220 of FIG. 2A) includes an upright impulse such as 220A and an inverted impulse 220B synchronized to the first frequency-domain narrow-band harmonic (e.g. 221) of FIG. 2B. The duration of the impulse varies in direct proportion, approximately, with the period of the highest order harmonic (e.g. the fifth frequency-domain narrow-band harmonic 225). The peak power thus varies in direct proportion, approximately, with $N^2$ (2N+1), or +18 dB relative to that of an individual harmonic or varies in direct proportion to N (2N+1)=+13 dB relative to the total power of the individual harmonics combined.

NBIR signals exhibit a variety of desirable characteristics, including, but not limited to:
  Occupies multiple narrow bandwidths allowing for enhanced frequency domain noise rejection,
  Co-exists with other RF signals without interference, Frequency channelization enables multiple narrowband impulse radio (NBIR) systems to operate on similar but offset frequencies, Individual harmonics operate with constant average transmit power, and Supports electrically small antenna arrays.

Figure 3:
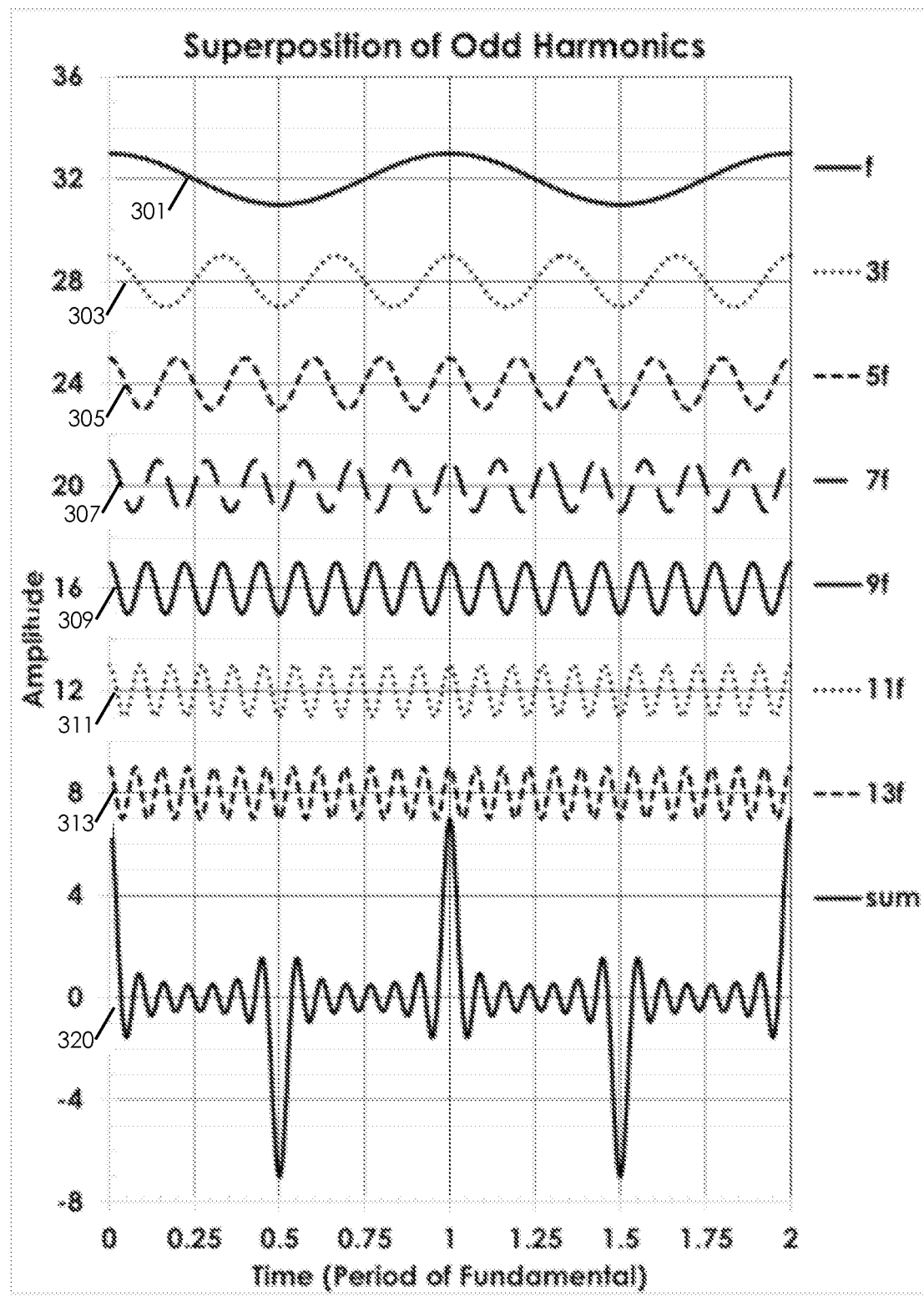
FIG. 3 presents a representative superposition of odd harmonics in the time domain.

FIG. 3 presents a second representative superposition of odd harmonics in the time domain. A first time-domain harmonic 301 with frequency "f," a third time-domain harmonic 303 with frequency "3f," a fifth time-domain harmonic 305 with frequency "5f," a seventh time-domain harmonic 307 with frequency "7f," a ninth time-domain harmonic 309 with frequency "9f," an eleventh time-domain harmonic 311 with frequency "11f," and a thirteenth time-domain harmonic 313 with frequency "13f," sum to yield a second representative odd-harmonic time-domain narrowband impulse radio (NBIR) signal 320 which is depicted in the lowermost portion of FIG. 3.

The seven unit-amplitude waves (301, 303, 305, 307, 309, 311, and 313) combine in a constructive alignment to yield a superposition NBIR signal 320 with N=7 times the amplitude and $N^2=7^2=49$ the peak energy. Since that peak occurs over 1/(2N+1) the period, the instantaneous power varies approximately in direct proportion to $N^2$ (2N+1), or +29 dB relative to that of an individual harmonic or as N (2N+1) =+20 dB relative to the total power of the individual harmonics combined. The amplitude of the second representative odd-harmonic time-domain narrowband impulse radio (NBIR) signal 320 of FIG. 3 is approximately that of an individual component wave, except where the waves add together to yield an upright or inverted impulse. The signal processing advantage of a multi-signal encoding scheme that can yield a +20 dB signal power advantage over the power of the individual signals should be clear to those skilled in the RF and signal processing arts.

Figure 4:
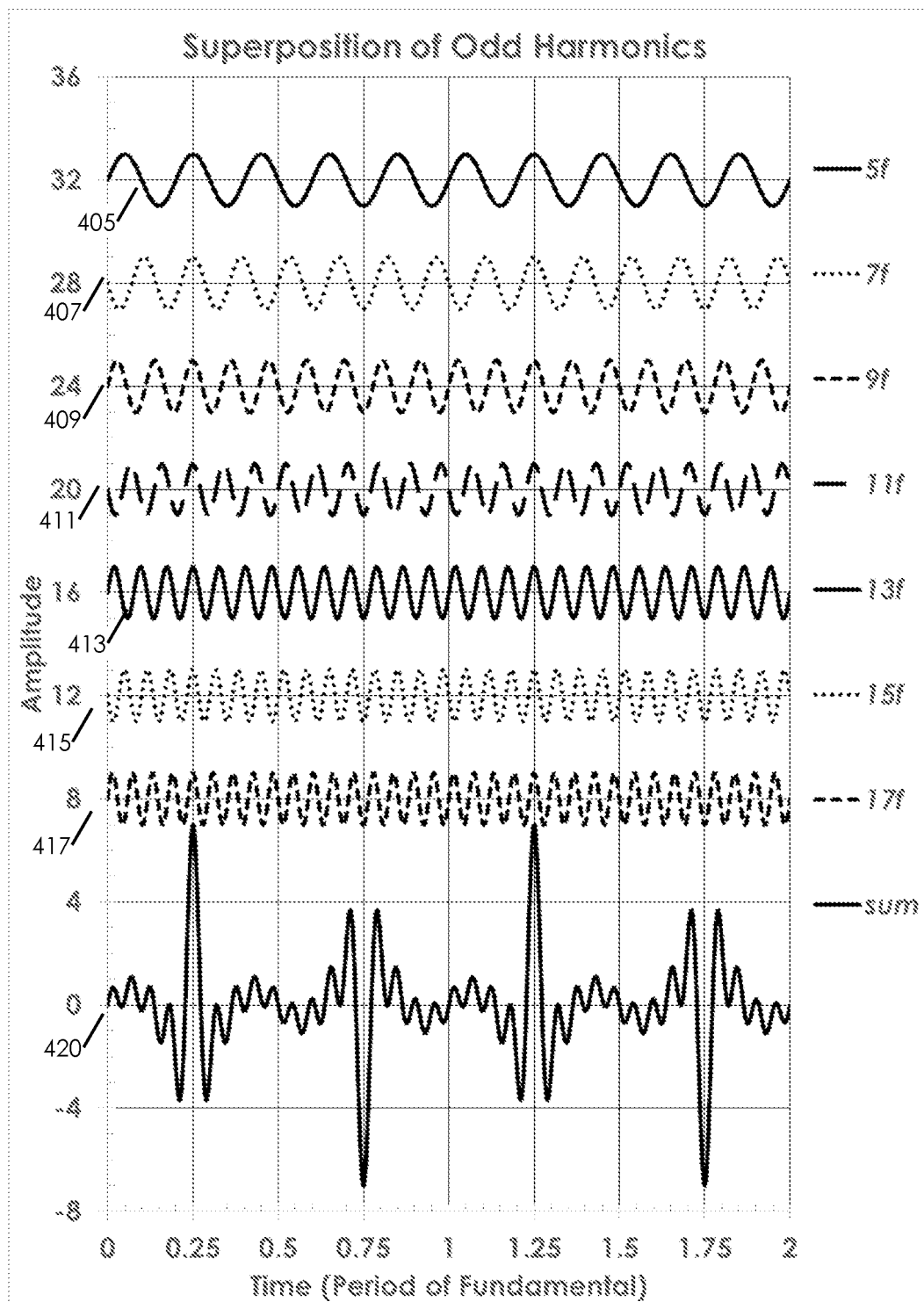
FIG. 4 shows an alternate superposition of odd harmonics in the time domain omitting some harmonics.

FIG. 4 shows an alternate superposition of odd harmonics in the time domain omitting some harmonics. A fifth time-domain harmonic 405 with frequency "5f," a seventh time-domain harmonic 407 with frequency "7f," a ninth time-domain harmonic 409 with frequency "9f," an eleventh time-domain harmonic 411 with frequency "11f," and a thirteenth time-domain harmonic 413 with frequency "13f," sum to yield an alternate odd-harmonic time-domain narrowband impulse radio (NBIR) signal 420 in a constructive alignment wherein the amplitude of NBIR signal 420 is equal to the sum of the amplitudes of the individual harmonics (405, 407, 409, 411, 413, 415 and 417). In FIG. 4, the first and third harmonics are not transmitted, thus resulting in an NBIR signal with a somewhat lower performance NBIR signal than the NBIR signal of FIG. 3.

The amplitude of the alternate odd-harmonic time-domain narrowband impulse radio (NBIR) signal 420 no longer approximates that of an individual component wave, except where the waves add together to yield an upright impulse or an inverted impulse due to the missing harmonics, namely the missing first harmonic at the fundamental frequency and the missing third harmonic. Still, there is a significant peak-to-average ratio and many of the characteristic advantages of NBIR signals may still be realized. This demonstrates robustness in the presence of jamming or otherwise compromised harmonics.

Figure 5:
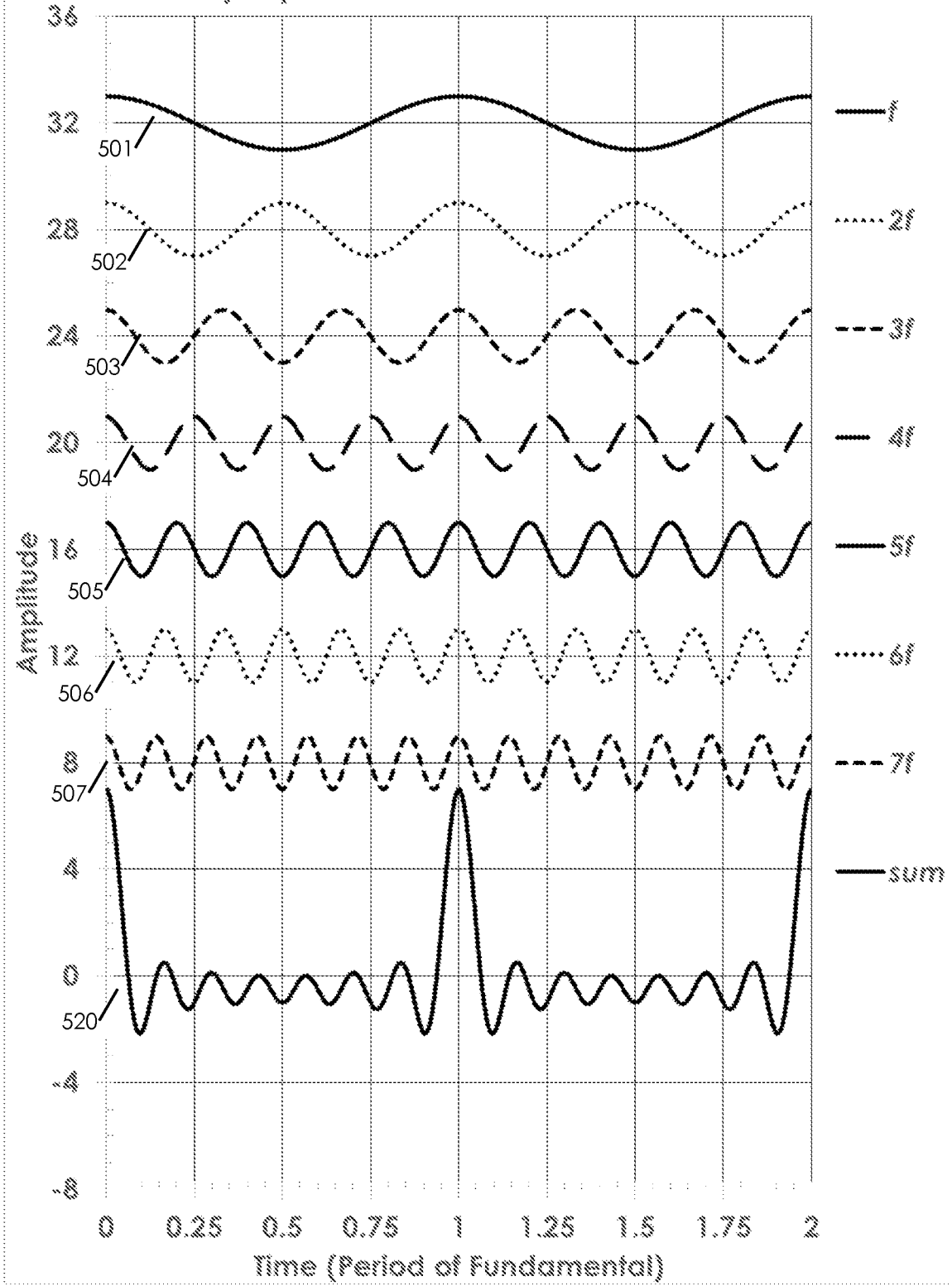
FIG. 5 depicts a representative superposition of all harmonics in the time domain omitting some harmonics.

FIG. 5 depicts a representative superposition of all harmonics in the time domain. A first time-domain harmonic 501 with frequency "f," a second time-domain harmonic 502 with frequency "2f," a third time-domain harmonic 503 with frequency "3f," a fourth time-domain harmonic 504 with frequency "4f," a fifth time-domain harmonic 505 with frequency "5f," a sixth time-domain harmonic 506 with frequency "6f," and a seventh time-domain harmonic 507 with frequency "7f" sum to yield a representative all-harmonic time-domain narrowband impulse radio (NBIR) signal 520 in a constructive alignment in which the amplitude of NBIR signal 520 is approximately equal to the sun of the amplitudes of the individual harmonics (501, 502, 503, 504, 505, 506, 507).

The seven unit-amplitude waves (501, 502, 503, 504, 505, 506, and 507) combine to yield a superposition NBIR signal 520 with N=7 times the amplitude of the individual harmonics and $N^2=7^2=49$ the peak energy. Since that peak occurs over 1/7 the period, the instantaneous power varies directly in proportion to $N^3$, or +25 dB relative to that of an individual harmonic or, $N^2=+17$ dB relative to the total power of the individual harmonics combined. The amplitude of the representative all-harmonic time-domain narrowband impulse (NBIR) signal 520 is approximately that of an individual component wave, except where the waves add together to yield an impulse.

In a preferred embodiment, the individual harmonics (501, 502, 503, 504, 505, 506, 507) exhibit substantially similar amplitudes. In alternate embodiments, these harmonics (501, 502, 503, 504, 505, 506, 507) may exhibit amplitude differences.

The representative all-harmonic time-domain narrowband impulse radio (NBIR) signal 520 approximates a series of DC impulses of amplitude N, however the baseline amplitude is equal to the negative of the unit amplitude so that the time average value is zero as physically required. Representative all-harmonic time-domain narrowband impulse (NBIR) signal 520 is thus a quasi-DC impulse whose pulse repetition frequency (PRF) is the same as the frequency of the fundamental harmonic 501.

Harmonic signals (e.g. 501, 502, 503, 504, 505, 506, 507) exhibit respective frequencies that are members of the set $f_0$ {1, 2, 3, 4, 5, . . . } where $f_0$ is the fundamental harmonic frequency for the harmonic signals. As used herein, the term "all harmonics" means all consecutive harmonics up to and including the $N^{th}$ harmonic. With reference to FIG. 5, wherein N=7, all harmonics refers to first harmonic 501 (an odd harmonic), second harmonic 502 (an even harmonic), third harmonic 503 (an odd harmonic), and so forth up to and including harmonic 507 (an odd harmonic.)

Figure 6:
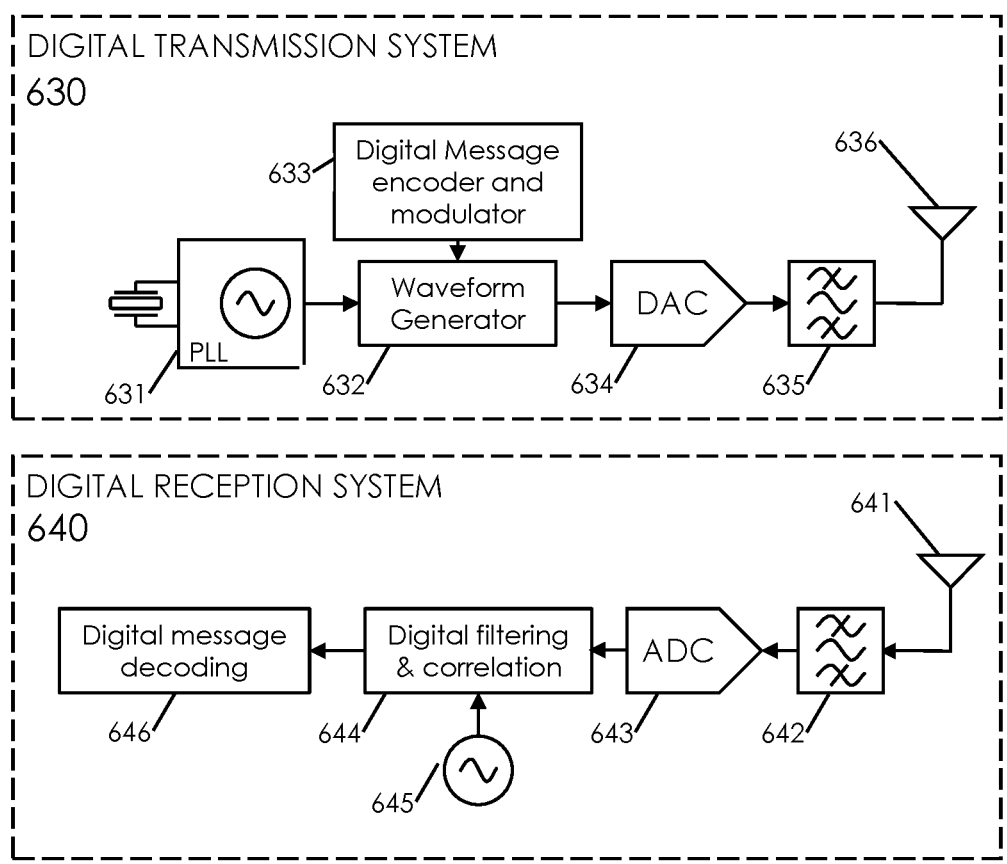
FIG. 6 presents a representative digital transmission and reception system.

FIG. 6 presents a representative digital transmission system 630 and a digital reception system 640. Digital transmission system 630 includes oscillator 631, waveform generator 632, digital message encoder 633, digital-to-analog converter (DAC) 634, filter 635, and antenna 636 coupled together as shown in FIG. 6. Digital reception system 640 includes antenna 641, filter 642, analog-to-digital convertor (ADC) 643, digital filter and correlator 644, local oscillator 645, and digital message decoder 646 coupled together as shown in FIG. 6. Digital transmission system 630 is a transmitter circuit architecture that transmits narrowband impulse radio (NBIR) signals, while digital reception system 640 is a receiver circuit architecture that receives the transmitted NBIR signals. In one embodiment, digital transmission system 630 may generate "all harmonics", i.e. both odd and even harmonics up to and including the $N^{th}$ harmonic, such as shown in the superposition of all harmonics depiction of FIG. 5. Transmitting NBIR signals with all harmonics, i.e. consecutive odd and even harmonics up to the $N^{th}$ harmonic, is preferred because this results in an NBIR signal in which the harmonic signal peaks are in the positive going direction, as shown in FIG. 5. However, if lower performance is acceptable in a particular application, digital transmission system 630 may alternatively be configured to transmit only odd harmonics such as shown in FIG. 4 (i.e. $5^{th}$ harmonic 405, $7^{th}$ harmonic 407, $9^{th}$ harmonic 409, . . . $N^{th}$ harmonic 417) and/or with other missing harmonics such as the first harmonic, second harmonic, third harmonic and fourth harmonic, as shown. In this alternative embodiment, NBIR signal performance is decreased somewhat because the harmonic peaks of the NBIR signal 420 are in both the positive and negative going directions, as shown at the bottom of FIG. 4.

Figure 7A:
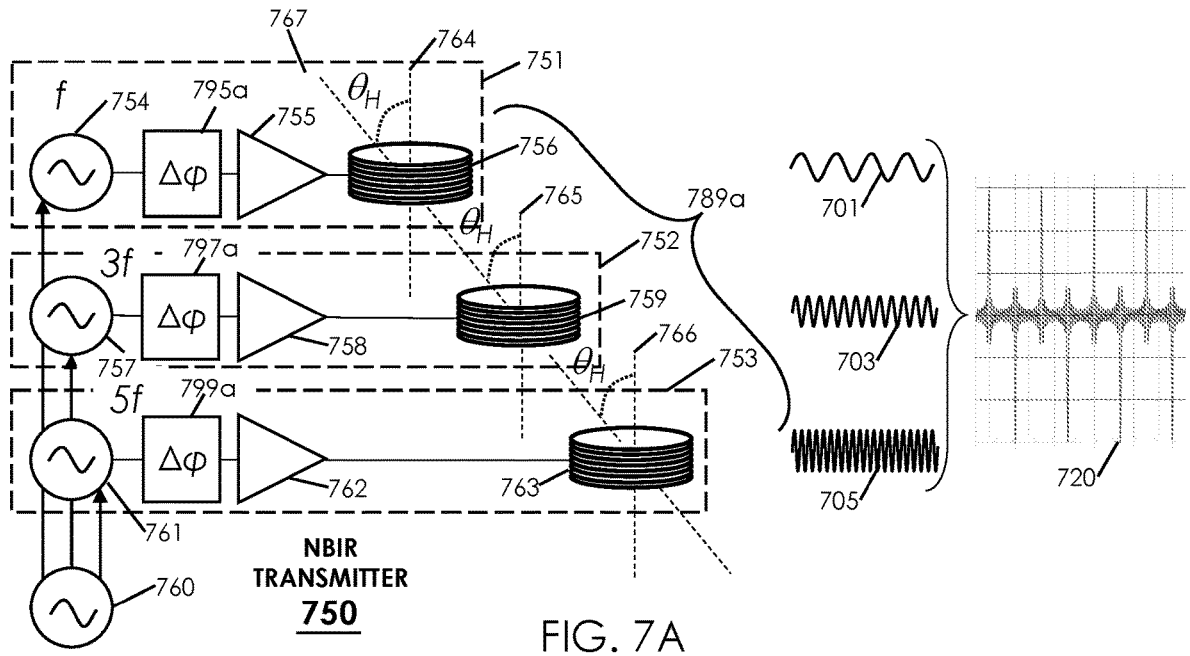
FIG. 7A depicts a preferred embodiment narrow band impulse radio transmitter.

FIG. 7A depicts a preferred embodiment narrow-band impulse radio (NBIR) transmitter 750. Preferred embodiment narrow-band impulse radio transmitter 750 includes a first transmitter module 751 transmitting first harmonic 701, a second transmitter module 752 transmitting third harmonic 703, a third transmitter module 753 transmitting fifth harmonic 705. Transmitter 750 also includes a common frequency reference 760 coupled to first transmitter module 751, second transmitter module 752 and third transmitter module 753, as shown. First transmitter module 751 includes a first oscillator 754, a first phase shifter 795a, a first transmit amplifier 755, and a first transmit antenna 756. Second transmitter module 752 includes a second oscillator 757, a second phase shifter 797a, a second transmit amplifier 758, and a second transmit antenna 759. Third transmitter module 751 includes a third oscillator 761, a third phase shifter 799a a third transmit amplifier 762, and a third transmit antenna 763. In an alternate embodiment, a plurality of transmitter amplifiers (e.g. 755, 758, 762) may further include a phase shifter (795a, 797a, 799a) so as to achieve a desired phase alignment of the harmonics (e.g. 701, 703, 705). A desired phase alignment may align harmonics (701, 703,705) to achieve an impulse-like NBIR signal 720 in the transmitted fields in free space.

In an alternate embodiment, a desired phase alignment may act to further obscure the time-domain signature of the NBIR signal 720 in free-space while cooperating with a complimentary set of phase shifters in a NBIR receiver, that apply an appropriate set of phase adjustments to restore or detect the NBIR signal 720.

In an alternate embodiment, the harmonically related overtones of a quartz crystal may be employed instead of the transmitter oscillators (e.g. 754, 757, 761) and the common frequency reference 760.

Preferred embodiment narrow-band impulse radio transmitter 750 provides a robust architecture wherein additional transmitter modules may be added to existing transmitter modules (e.g. 751, 752, and 753) to provide harmonics in addition to existing harmonics (e.g. 701, 703, 705).

The first antenna 756, the second antenna 759, and the third antenna 763, are preferentially magnetic antennas arranged in a minimum coupling configuration. In a preferred embodiment, first magnetic axis 764 of the first antenna 756, second magnetic axis 765 of the second antenna 759, and third magnetic axis 766 of the third antenna 763, are mutually arranged at the Hazeltine angle $\theta_H$=~55 degrees with respect to a common axis 767 so as to achieve minimum mutual coupling between the antennas (756, 759, 763). Together, the first antenna 756, the second antenna 759 and the third antenna 783 form a broadband antenna 789a, as depicted in FIG. 7A.

Preferred embodiment narrow-band impulse radio transmitter 750 may be configured to transmit odd harmonics (as shown), all harmonics, or any combination of CW signals.

Figure 7B:
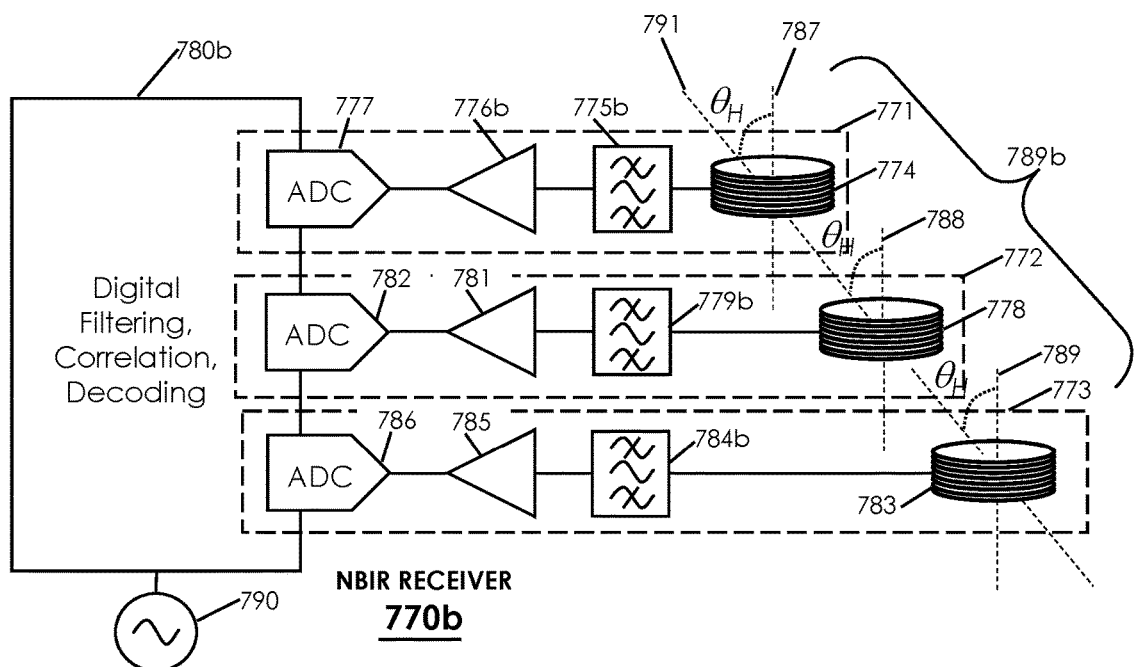
FIG. 7B shows a preferred embodiment narrow band impulse radio receiver.

FIG. 7B shows a preferred embodiment narrow-band impulse radio (NBIR) receiver 770b. The preferred embodiment narrow-band impulse radio receiver 770 includes a first receiver module 771 receiving first harmonic 701, a second receiver module 772 receiving third harmonic 703, a third receiver module 773 receiving fifth harmonic 705, a Digital filter, correlator, and decoder 780b, and a frequency source 790. The first receiver module 771 includes first receive antenna 774, first receive filter 775b, first receive amplifier 776b, and first receive ADC 777. The second receiver module 772 includes second receive antenna 778, second receive filter 779b, second receive amplifier 781, and second receive ADC 782. The third receiver module 773 includes third receive antenna 783, third receive filter 784b, third receive amplifier 785, and third receive ADC 786.

Preferred embodiment narrow-band impulse radio receiver 770 provides a robust architecture wherein additional receiver modules may be added to existing receiver modules (e.g. 771, 772, and 773) so as to receive harmonics in addition to existing harmonics (e.g. 701, 703, 705) already depicted in FIG. 7B.

The first receive antenna 774, the second receive antenna 778, and the third receive antenna 783, are preferentially magnetic antennas arranged in a minimum coupling configuration. In a preferred embodiment, first magnetic axis 787 of the first receive antenna 774, second magnetic axis 788 of the second receive antenna 778, and third magnetic axis 789 of the third receive antenna 783, are mutually arranged at approximately the Hazeltine angle $\theta_H$=~55 degrees with respect to a common axis 791. The receive antenna system 789b (indicated by bracketing in FIG. 7B) includes a plurality of magnetic antennas (774, 778, 783) arranged in a minimum coupling configuration.

In alternate embodiments, the receive antenna system 789b may employ multiple-resonant antennas to capture NBIR signals. When narrow-band impulse radio receiver 770b of FIG. 7B is co-located with narrow-band impulse radio transmitter 750 of FIG. 7A, transmit common axis 767 and receive common axis 791 may themselves be common so that a plurality of receive antennas (e.g. 774, 778, 783) may provide minimum coupling and enhanced isolation with respect to transmit antennas (e.g. 756, 759, 763). Isolation of −50 dB to −60 dB is achievable even between closely spaced antennas. Additional transmit receive isolation is provided by the fact that in this embodiment the transmitted harmonics mutually interfere to yield a background clutter signal with the amplitude and power of an individual harmonic, while the receive signal will exhibit an amplitude proportional to the number of signals employed, N, and an instantaneous power on the order of $N^3$.

Preferred embodiment narrow-band impulse radio receiver 770b may be configured to receive odd harmonics (as shown), all harmonics, or any combination of CW signals. In alternate embodiments, instead of harmonic series the system may employ non-harmonic frequency CW signals so selected as to minimize secondary interferences and maximize the peak-to-average ratio. Non-harmonic signals whose frequencies form prime ratios with respect to each other are one example (e.g. 3, 5, 7, 11, 13, 17, 19).

Figure 7C:
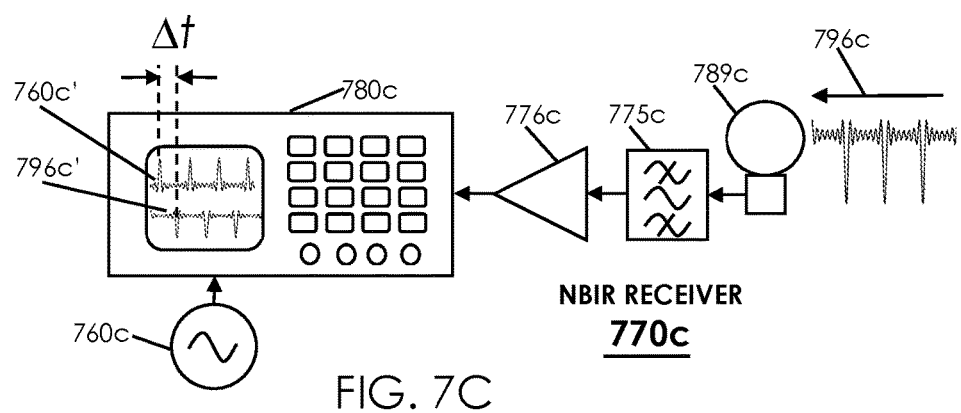
FIG. 7C presents a first alternate embodiment narrow band impulse radio receiver.

FIG. 7C presents a first alternate embodiment narrow band impulse radio (NBIR) receiver 770c. The first alternate embodiment narrow band impulse radio receiver 770c includes broadband antenna 789c, multi-band filter 775c, preamplifier 776c, oscilloscope 780c and frequency reference 760c. The broadband antenna 789c is preferentially a broadband antenna capable of receiving incident signal 796c. The multi-band filter 775c preferentially exhibits a frequency response capable of passing harmonics associated with incident signal 796c while rejecting other potentially interfering or undesired signals or noise. Preamplifier 776c preferentially exhibits a low noise figure and significant gain at the frequencies of the relevant harmonics of incident signal 796c. The oscilloscope 780c is capable of measuring the time difference (Δt) between incident signal 796c and the reference signal supplied by frequency reference 760c, in a radar application or location application, or otherwise demodulating incident signal 796c so as to recover a digital or analog message. Reference signal 760c is phase locked to an appropriate harmonic of incident signal 796c or directly to a transmit signal source, if the first alternate embodiment narrow band impulse radio receiver 770c is co-located with a transmitter. As viewed on oscilloscope 780c, the lower signal 796c' corresponds to incident signal 796c, while the upper signal 760c' is related to the reference signal 760c as discussed above.

Figure 7D:
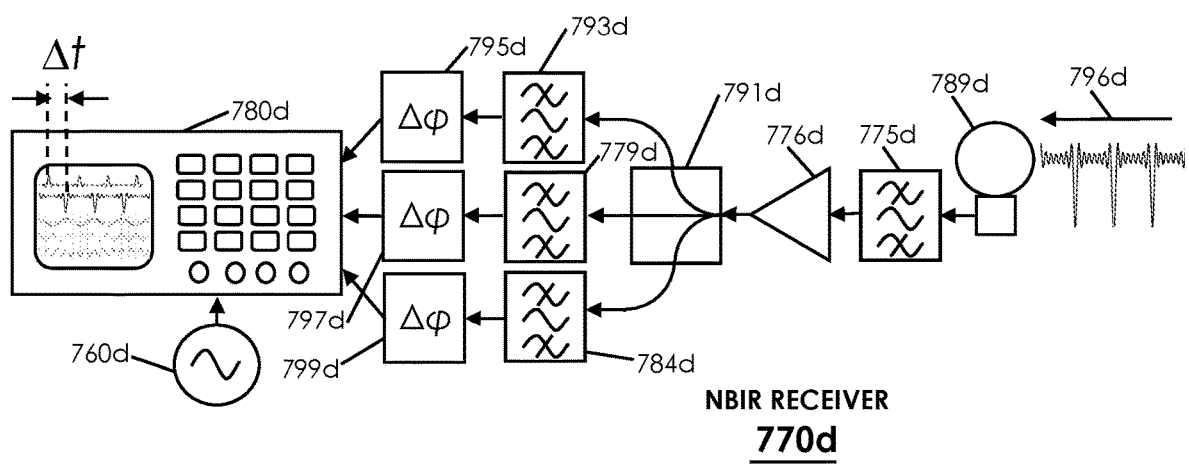
FIG. 7D displays a second alternate embodiment narrow band impulse radio receiver.

FIG. 7D depicts a second alternate embodiment narrow band impulse radio (NBIR) receiver 770d. The second alternate embodiment narrow band impulse radio receiver 770d includes broadband antenna 789d, multi-band filter 775d, preamplifier 776d, signal splitter 791d, first harmonic bandpass filter 793d, second harmonic bandpass filter 779d, third harmonic bandpass filter 784d, first phase shifter 795d, second phase shifter filter 797d, third phase shifter filter 799d, multi-channel oscilloscope 780d, and frequency reference signal source 760d. The broadband antenna 789d is preferentially a broadband antenna capable of receiving incident signal 796d. The multi-band filter 775d preferentially exhibits a frequency response capable of passing harmonics associated with incident signal 796d while rejecting other potentially interfering or undesired signals or noise. Preamplifier 776d preferentially exhibits a low noise figure and significant gain at the frequencies of the relevant harmonics of incident signal 796d. Signal splitter 791d splits incident signal 796d into three copies. First harmonic bandpass filter 793d isolates a first harmonic from incident signal 796d and conveys the isolated first harmonic to first phase shifter 795d. Second harmonic bandpass filter 779d isolates a second harmonic from incident signal 796d and conveys the isolated second harmonic to second phase shifter 797d. Third harmonic bandpass filter 784d isolates a third harmonic from incident signal 796d and conveys the isolated third harmonic to third phase shifter 799d. First phase shifter 795d, second phase shifter filter 797d, and third phase shifter filter 799d apply a user selectable variable phase shift to the isolated first harmonic, the isolated second harmonic, and the isolated third harmonic, respectively.

The phase shifters (795d, 797d, 799d) in NBIR receiver 770d of FIG. 7D may cooperate to provide a complementary set of phase shifters to recover or detect an NBIR signal whose phases have been perturbed by transmit phase shifters (795a, 797a, 799a of FIG. 7A), or the propagation environment, or both.

In an ideal line-of-sight environment, phases of the respective harmonics may follow a linear relationship correlated to the time-of-flight, or equivalently, the distance of flight. This allows for easy ranging. In less ideal environments, the phase of one or more harmonics may be adjusted so as to optimize the composite signal strength.

Multi-channel oscilloscope 780d, is capable of summing harmonics from first phase shifter 795d, second phase shifter filter 797d, and third phase shifter filter 799d to provide a composite phase-shifted signal. In alternate embodiments, a summer may be employed to provide the composite phase-shifted signal. Multi-channel oscilloscope 780d measures the time difference (Δt) between incident signal 796d and a reference signal from the reference signal source 760d, in a radar application or location application, or otherwise demodulating incident signal 796d so as to recover a digital or analog message. Reference signal source 760d is phase locked to an appropriate harmonic of incident signal 796d or directly to a transmit signal source, if the first alternate embodiment narrow band impulse radio receiver 770d is co-located with a transmitter.

The first alternate embodiment narrow band impulse radio receiver 770c of FIG. 7C and the second alternate embodiment narrow band impulse radio receiver 770d of FIG. 7D illustrate specific examples of how the disclosed system may be implemented In the preferred embodiment, narrow band impulse radio receiver 770b of FIG. 7B, the manual evaluation or demodulation via an oscilloscope (780c, 780d) and manual optimization of phase shifting via phase shifters (793d, 779d, 784d) are digitally automated through optimization techniques including, but not limited to, varying phase through all possible combinations to peak amplitude, varying phase of individual harmonics relative to an approximate peak to peak amplitude, or varying phase of individual harmonics relative to an anticipated phase profile for a given propagation environment.

For ease of illustration and explication, examples are shown with three harmonics. The advantages of the NBIR technique are further enhanced as the square or cube of the number of harmonics employed, so preferred embodiments will have as many harmonics as possible, limited only by other real-world engineering constraints.

Applications

Figure 8:
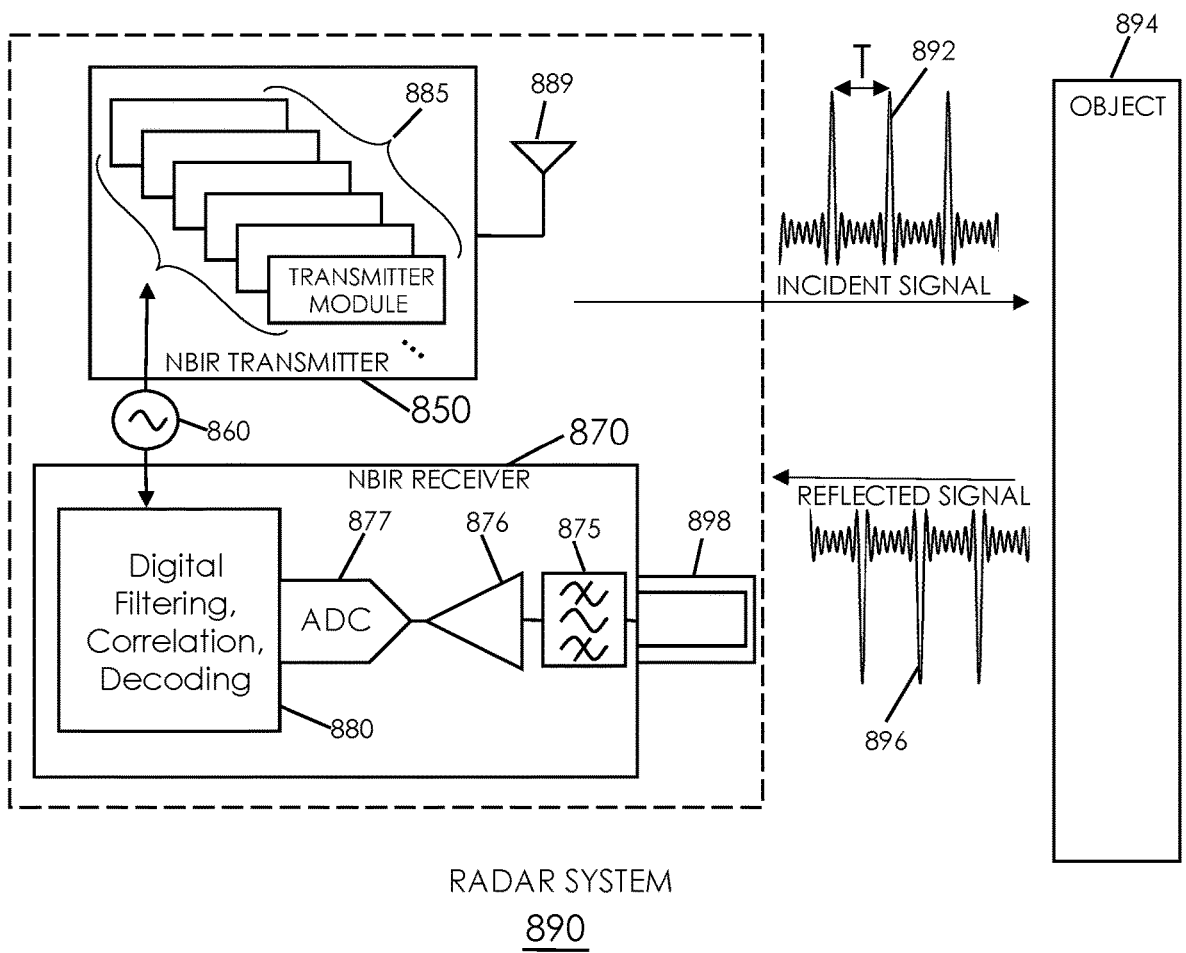
FIG. 8 presents a preferred embodiment narrow band impulse radar system.

FIG. 8 presents a preferred embodiment narrow band impulse radio (NBIR) radar system 890. Preferred embodiment NBIR radar system 890 includes a narrow-band impulse transmitter 850 with an efficient transmit antenna system 889, a narrow-band impulse receiver 870 with a receive antenna 898, and a common oscillator 860. The narrow-band impulse transmitter 850 further includes a plurality of transmitter modules 885. The narrow-band impulse receiver 870 further includes receive filter 875, receive amplifier 876, receive ADC 877, and digital filter and correlator 880. In this embodiment, the narrow-band impulse transmitter 850 radiates an all-harmonic quasi-DC impulse transmitted signal 892. Acting as an incident signal, the quasi-DC impulse transmitted signal 892 interacts with an object 894 yielding a reflected signal 896. The narrow-band impulse receiver 870 receives the reflected signal 896 via the electrically-small directional receive antenna 898. Reflected signal 896 is inverted relative to the incident transmit signal 892, assisting in discrimination between incident signal 892 and reflected signal 896. In a preferred embodiment, receive antenna 889 is a directive electrically small antenna (see U.S. Pat. No. 9,209,525, issued Dec. 8, 2015, entitled "Directive, Electrically-Small UWB Antenna System and Method", which is incorporated herein by reference in its entirety).

The disclosed NBIR technology has the advantage that the NBIR signal is fully described by the amplitude and phase of the individual harmonics, making data storage and analysis vastly easier than traditional ultra-wideband impulse radio systems which need high-resolution sampling to capture details of the waveform. In many real-world scenarios, the relative phases of the harmonics will shift due to multipath or differences in target response. Because NBIR signals are fully described by the amplitude and phase of the individual harmonics digital alignment, optimization and analysis become much easier than for legacy radar systems.

NBIR signals are well suited for radar applications including ground penetrating radar (GPR). The distributed narrowband spectral nature of NBIR signals more efficiently samples the environment than continuous spectrum signals with closely adjacent frequency components. An array of electrically-small, high Q, antennas like antenna system 889, enables a relatively high-efficiency yet electrically-small antenna system capable of transmitting a low-frequency content impulse signal. The ability to implement low-frequency impulse signals makes NBIR radio well-suited for propagation in indoor environments, in the presence of foliage, in an urban environment, underground, or underwater. In terms of this embodiment, low-frequency means less than approximately 30 MHz. Tunnel imaging, buried wire detection, power line collision avoidance, and submerged target detection are all applications where NBIR systems and methods offer significant advantages.

An NBIR radar is well-suited for human target detection in a radar range detection or a more general passive target detection and location. The inventor has determined through Numerical Electromagnetic Code (NEC) antenna analysis that an erect human target reflects best in the range from 20-200 MHz. The pulse repetition rate in an NBIR system follows from the lowest harmonic. For instance, at 10 MHz, superimposing all harmonics yields a pulse every 0.10 µs and an unambiguous range of about 50 ft. Modulation techniques may extend this unambiguous range significantly by allowing discrimination between successive impulses.

In the preferred embodiment NBIR radar, NBIR transmitter 850 and NBIR receiver 870, are co-located to allow use of a common oscillator 860 for ease of synchronization. However, NBIR radar may be employed in monostatic, bistatic, and/or multistatic configurations.

The ability of NBIR signals to achieve high peak power makes them well-suited for electronic warfare (EW) applications, as well.

The disclosed narrowband impulse radio system is a profoundly powerful technology believed to be deserving of the broad interpretation due a pioneer patent. The pioneering nature of the present invention becomes clear on comparison to prior art techniques for enhancing transmission and reception of radio signals. In a Gaussian noise environment, consider a signal repeated n times in a period T to enable us to sample the signal n times and integrate the resulting samples to enhance the SNR. The signal and noise energy have been divided into n time segments. When we add them back up, we recover the original noise energy, but each 1/nth segment of signal energy adds together coherently to yield $n^2/n$ or a net factor of n enhancement in the SNR. This is the performance one expects from prior art techniques such as conventional rake receivers.

Compare against an NBIR impulse whose fundamental harmonic has the same period T as the duration over which the integration was performed above. There exists a similar enhancement of the signal power. The NBIR transmitter splits total transmit power into N carriers, and the 1/Nth energy carriers add up coherently to yield the same $N^2/N$ or a net factor of N enhancement in the signal energy. Because all the energy has been concentrated in the impulse, however, and because the impulse has a time duration on the order of 1/Nth the period, we can reject all but about 1/Nth the noise through time gating the received signal. The SNR of an NBIR system thus scales roughly as $N^2$, a significant and remarkable advantage over conventional signal integration techniques which scale as n.

Because of the enhanced SNR from the NBIR system, the NBIR system exhibits the corresponding enhancements in data rate calculable from Shannon's Law. Any of a variety of phase or frequency modulation techniques might be usefully employed in conjunction with the present invention.

The wide range of frequencies employed by the NBIR method does mean that the different harmonically-related carriers would potentially experience different attenuations and phase shifts. These have value as a metric for range or to probe intervening material. In an alternate embodiment, an NBIR transmitter might advantageously adjust transmit power and phase of the harmonics to compensate for the characteristics of a particular propagation environment.

Figure 9:
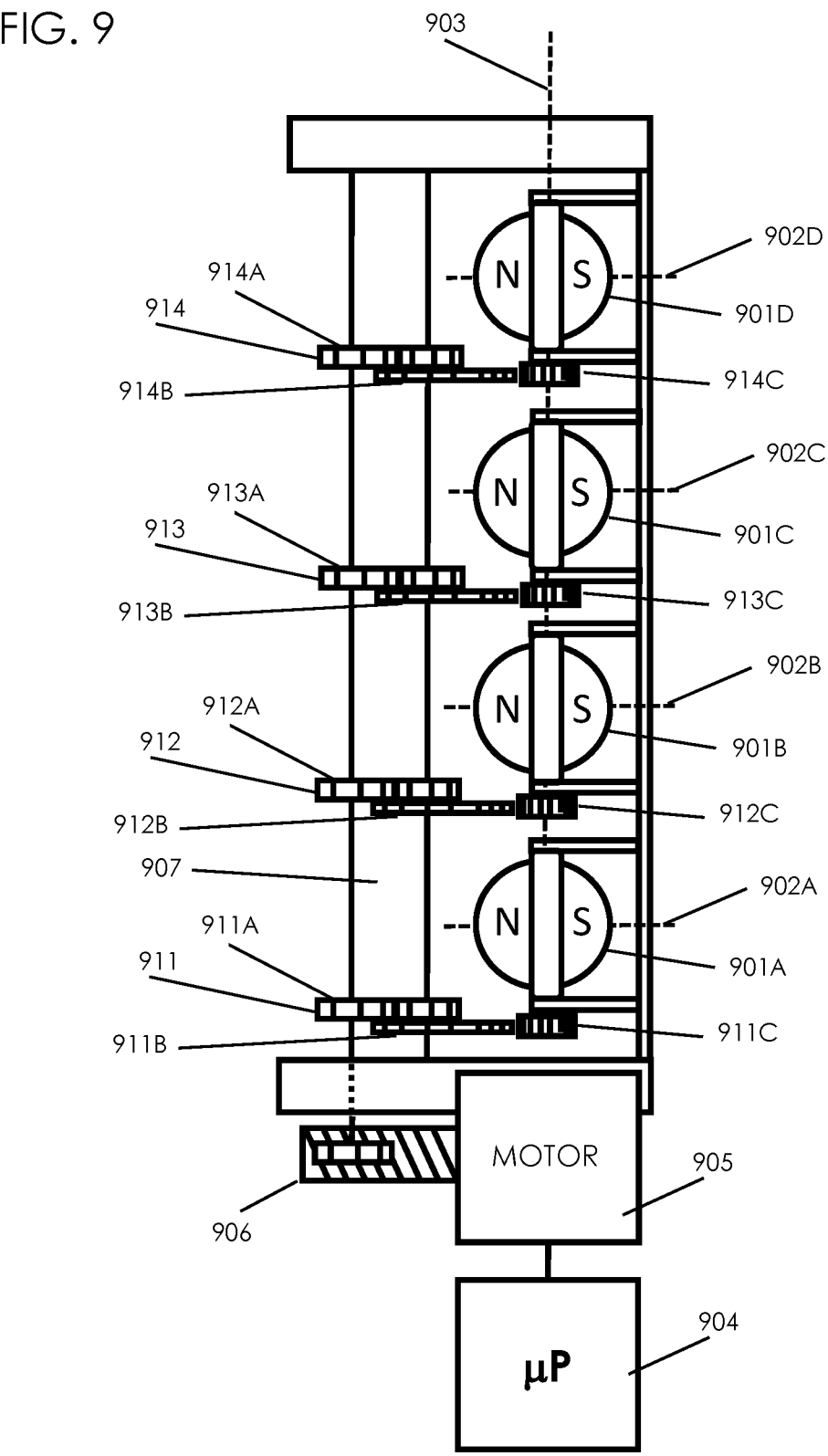
FIG. 9 shows an alternative embodiment low frequency NBIR transmitter.

FIG. 9 shows an alternate embodiment low frequency mechanical NBIR transmitter 900. The alternate embodiment low frequency mechanical NBIR transmitter 900 includes a plurality of permanent magnets (such as magnets 901A, 901B, 901C, 901D), each exhibiting a respective magnetic axis (such as axes 902A, 902B, 902C, 902D), each of the plurality of permanent magnets rotating about a common axis 903 that is orthogonal to the respective magnetic axes. In this embodiment, each magnet generates a respective harmonic signal. A microprocessor (904) controlled motor (905) employs worm gear 906 to rotate shaft 907 thus coupling rotation of motor 905 to the permanent magnets via respective mechanical couplings (such as mechanical couplings 911, 912, 913 and 914). The mechanical couplings 911, 912, 913 and 914 ensure that the permanent magnets rotate at harmonically related mechanical frequencies yielding harmonically-related radio frequencies. In this manner, rotating magnet 901A generates a first harmonic at the fundamental frequency, rotating magnet 901B generates the third harmonic, rotating magnetic 901C generates the 5th harmonic and rotating magnet 901D generates the 7th harmonic, such that the harmonics are superimposed on one another in constructive alignment, as in the electrically-implemented embodiments discussed above, to form an NBIR signal.

As in the embodiments described in FIGS. 6-8, mechanical NBIR transmitter 900 employs phase shifting to assure the constructive alignment of the harmonics. However, in NBIR transmitter 900, the phase shifting for each harmonic is mechanically generated as discussed below.

In more detail now with respect to mechanical couplings 911, 912, 913 and 914, mechanical coupling 911 includes a main shaft gear 911A, center gear 911B and a magnet drive gear 911C. As motor 905 turns worm gear 906, shaft 907 and main shaft gear 911A rotate to drive center gear 911B that in turn rotates magnet drive gear 911C and magnet 910A. In a similar manner, mechanical coupling 912 includes a main shaft gear 912A, center gear 912B and a magnet drive gear 912C. Likewise, mechanical coupling 913 includes a main shaft gear 913A, center gear 913B and a magnet drive gear 913C. Further, mechanical coupling 914 includes a main shaft gear 914A, center gear 914B and a magnet drive gear 914C.

The gear ratios selected for the mechanical couplings 911, 912, 913 and 914 relate to the particular harmonic frequency each respective magnet 901A, 901B, 901C and 901D generates. By way of example, the gear ratios may be selected such that lowermost magnet 901A rotates once, while magnet 901B rotates twice, magnet 901C rotates three times and magnet 901D rotates 4 times. Each of magnets 901A, 901B, 901C and 901D in this mechanical embodiment may exhibit a particular phase shift to achieve the constructive alignment of the respective harmonics in a manner analogous to the above described electrical embodiments. For a particular mechanical coupling, such as mechanical coupling 912 for example, this phase shift may be introduced by temporarily disengaging one of the gears of mechanical coupling 912 from main shaft 907, rotating the magnet 901B to an angle corresponding to the desired phase shift associated with the particular corresponding harmonic for magnet 901B, and subsequently reengaging the gears of mechanical coupling 912 to shaft 907.

In an alternative embodiment, it is also possible to configure the mechanical couplings 911, 912, 913 and 914 so that the rotating magnetic generate not only the even harmonics but all harmonics such as the $1^{st}$ harmonic, $2^{nd}$ harmonic, $3^{rd}$ harmonic and 4 harmonic, and so forth with the number of harmonics being selected according to the particular application. It is also noted that a frequency-shift keying (FSK) modulation may be implemented by varying the motor speed.

The alternate embodiment low frequency mechanical NBIR transmitter 900 is well-suited for operation in the ultra-low frequencies (ULF) band (30 Hz-3 kHz) and the very-low frequency (VLF) band (3 kHz-30 kHz). Mechanical limitations make the alternate embodiment low frequency mechanical NBIR transmitter 900 difficult to implement at higher frequencies. The lowest frequency harmonics with the longest wavelengths benefit most from having a dedicated transmit or receive module or a dedicated antenna servicing a particular harmonic. In alternate embodiments, a hybrid system may be preferred in which some harmonics employ a dedicated module and antenna for each harmonic, and other harmonics are combined on other shared modules and antennas.

Although the alternate embodiment low frequency mechanical NBIR transmitter 900 as shown involves four permanent magnets 901A, 901B, 901C and 901D, any number of permanent magnets may be employed subject to the usual engineering tradeoffs of complexity and performance. In the alternate embodiment low frequency mechanical NBIR transmitter 900, the permanent magnets are aligned along the common axis 907. In alternate embodiments the permanent magnets may be aligned along different axes, although for optimal performance different axes of alignment should be co-parallel.

A practical implementation of a NBIR system preferably avoids restricted frequency bands. In the US, for instance, two options are available for NBIR systems that span spectral content from the Ultra-High Frequency (UHF) band (300 MHz-3 GHz) up to X-Band (7-11.2 GHz). Option A employs eight harmonics of 427.5 MHz. Option B employs twelve harmonics of 883 MHz. In each case the available bandwidth around each harmonic is relatively limited, making these NBIR implementations best-suited for applications requiring low data bandwidth, like radars (including ground penetrating radar and through-wall radar) or location and positioning systems. Table 1 below presents these options.

TABLE 1

Harmonic Frequencies (in MHz)

| Harmonic | Option A | Option B |
|----------|----------|----------|
| 1        | 427.5    | 883      |
| 2        | 855      | 1766     |
| 3        | 1282.5   | 2649     |
| 4        | 1710     | 3532     |
| 5        | 2137.5   | 4415     |
| 6        | 2565     | 5298     |
| 7        | 2992.5   | 6181     |
| 8        | 3420     | 7064     |
| 9        |          | 7947     |
| 10       |          | 8830     |
| 11       |          | 9713     |
| 12       |          | 10596    |

These disclosed harmonic schemes should be taken as illustrative and not as limiting. NBIR signaling is well suited to electronic warfare applications. For instance, in one illustrative implementation, an NBIR system employing a thousand harmonics aligned at 10 MHz, 20 MHz, . . . 9,990 MHz, 10,000 MHz with 1 W continuous power to each harmonic could generate a train of gigawatt instantaneous power impulses with a 100 ns repetition rate over a picosecond time scale. Nothing in the present disclosure should be interpreted as limiting the present teachings to systems involving electromagnetic waves. Audio waves (acoustic waves), mechanical waves, and other waves may be employed as well in NBIR systems.

CONCLUSION

The disclosed technology has been described above with the aid of physical structures and also functional building blocks illustrating the performance of the disclosed technology. The boundaries of the functional building blocks have been arbitrarily defined herein for the convenience of the description. Alternate boundaries can be defined and employed so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. One should understand that numerous variations may be made by one skilled in the art based on the teachings herein. Thus, the breadth and scope of the present invention should not be limited by any of the above-described exemplary embodiments, but should be defined only in accordance with the following claims and their equivalents.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A narrowband impulse radio system comprising:
   a transmitter, transmitting a plurality of harmonic signals, and
   a receiver, receiving the plurality of harmonic signals, wherein the plurality of harmonic signals cooperate in a constructive alignment to provide a narrowband impulse signal exhibiting an amplitude approximately equal to the sum of the amplitudes of the plurality of harmonic signals, wherein each harmonic signal of the plurality of harmonic signals received by the receiver exhibits a respective phase, the receiver including a plurality of phase shifters that adjust the respective phases of the plurality of harmonic signals to provide the constructive alignment.

2. The narrowband impulse radio system of claim 1, wherein the harmonic signals of the plurality of harmonic signals exhibit consecutive odd and even harmonics.

3. The narrowband impulse radio system of claim 1, wherein the harmonic signals of the plurality of harmonic signals exhibit odd harmonics.

4. The narrowband impulse radio of claim 1, wherein the plurality of harmonic signals are acoustic wave signals.

5. A narrowband impulse radio system comprising:
a transmitter, transmitting a plurality of harmonic signals, and
a receiver, receiving the plurality of harmonic signals,
wherein the plurality of harmonic signals cooperate in a constructive alignment to provide a narrowband impulse signal exhibiting an amplitude approximately equal to the sum of the amplitudes of the plurality of harmonic signals,
wherein a harmonic signal of the plurality of harmonic signals exhibits a fundamental harmonic frequency, and further wherein the harmonic signals of the plurality of harmonic signals cooperate to provide a quasi-DC signal whose pulse rate that is equal to the fundamental harmonic frequency.

6. A narrowband impulse radio system comprising:
a transmitter, transmitting a plurality of harmonic signals, and
a receiver, receiving the plurality of harmonic signals,
wherein the plurality of harmonic signals cooperate in a constructive alignment to provide a narrowband impulse signal exhibiting an amplitude approximately equal to the sum of the amplitudes of the plurality of harmonic signals,
wherein the transmitter further comprises a plurality of transmit modules, and further wherein each transmit module of the plurality of transmit modules transmits one of the plurality of harmonics, each transmit module of the plurality of transmit modules further including a respective magnetic antenna, each respective magnetic antenna exhibiting a respective magnetic axis, each respective magnetic axis being aligned at an angle of approximately 55 degrees relative to a common axis of the magnetic antennas.

7. A narrowband impulse radio system comprising:
a transmitter that transmits a plurality of harmonic signals,
wherein the plurality of harmonic signals cooperate in a constructive alignment to provide a narrowband impulse signal exhibiting an amplitude approximately equal to the sum of the amplitudes of the plurality of harmonic signals, and
wherein each harmonic signal of the plurality of harmonic signals transmitted by the transmitter exhibits a respective phase, the transmitter including a plurality of phase shifters that adjust the respective phases of the plurality of harmonic signals to provide the constructive alignment, wherein a harmonic signal of the plurality of harmonic signals exhibits a fundamental harmonic frequency, and further wherein the harmonic signals of the plurality of harmonic signals cooperate to provide a quasi-DC signal whose pulse rate that is equal to the fundamental harmonic frequency.

8. The narrowband impulse radio system of claim 7, wherein the harmonic signals of the plurality of harmonic signals exhibit consecutive odd and even harmonics.

9. The narrowband impulse radio system of claim 7, wherein the harmonic signals of the plurality of harmonic signals exhibit odd harmonics.

10. The narrowband impulse radio system of claim 7, wherein the transmitter further comprises a plurality of transmit modules, and further wherein each transmit module of the plurality of transmit modules transmits one of the plurality of harmonics, each transmit module of the plurality of transmit modules further including a respective magnetic antenna.

11. The narrowband impulse radio of claim 7, wherein each respective magnetic antenna exhibits a respective magnetic axis, each respective magnetic axis being aligned at an angle of approximately 55 degrees relative to a common axis of the magnetic antennas.

12. A narrowband impulse radio system comprising:
a receiver that receives a plurality of harmonic signals,
wherein the plurality of harmonic signals cooperate in a constructive alignment to provide a narrowband impulse signal exhibiting an amplitude approximately equal to the sum of the amplitudes of the plurality of harmonic signals, and
wherein each harmonic signal of the plurality of harmonic signals received by the receiver exhibits a respective phase, the receiver including a plurality of phase shifters that adjust the respective phases of the plurality of harmonic signals to provide the constructive alignment.

13. The narrowband impulse radio system of claim 12, wherein a harmonic signal of the plurality of harmonic signals exhibits a fundamental harmonic frequency, and further wherein the harmonic signals of the plurality of harmonic signals cooperate to provide a quasi-DC signal whose pulse rate that is equal to the fundamental harmonic frequency.

14. The narrowband impulse radio system of claim 12, wherein the harmonic signals of the plurality of harmonic signals exhibit consecutive odd and even harmonics.

15. The narrowband impulse radio system of claim 12, wherein the harmonic signals of the plurality of harmonic signals exhibit odd harmonics.

16. A method of transmitting a narrowband impulse radio signal comprising:
transmitting, by a plurality of transmitter modules, a respective plurality of harmonic signals, wherein the plurality of harmonic signals cooperate in a constructive alignment to provide a narrowband impulse signal exhibiting an amplitude approximately equal to the sum of the amplitudes of the plurality of harmonic signals, wherein each harmonic signal of the plurality of harmonic signals exhibits a respective phase, and
adjusting, by a plurality of phase shifters in the plurality of transmitter modules, the respective phases of the plurality of harmonic signals to provide the constructive alignment,
wherein a harmonic signal of the plurality of harmonic signals exhibits a fundamental harmonic frequency, and further wherein the harmonic signals of the plurality of harmonic signals cooperate to provide a quasi-DC signal whose pulse rate that is equal to the fundamental harmonic frequency.

17. The method of claim 16, wherein the harmonic signals of the plurality of harmonic signals exhibit consecutive odd and even harmonics.

18. The method of claim 16, wherein the harmonic signals of the plurality of harmonic signals exhibit odd harmonics.

\* \* \* \* \*